UNITED STATES PATENT OFFICE.

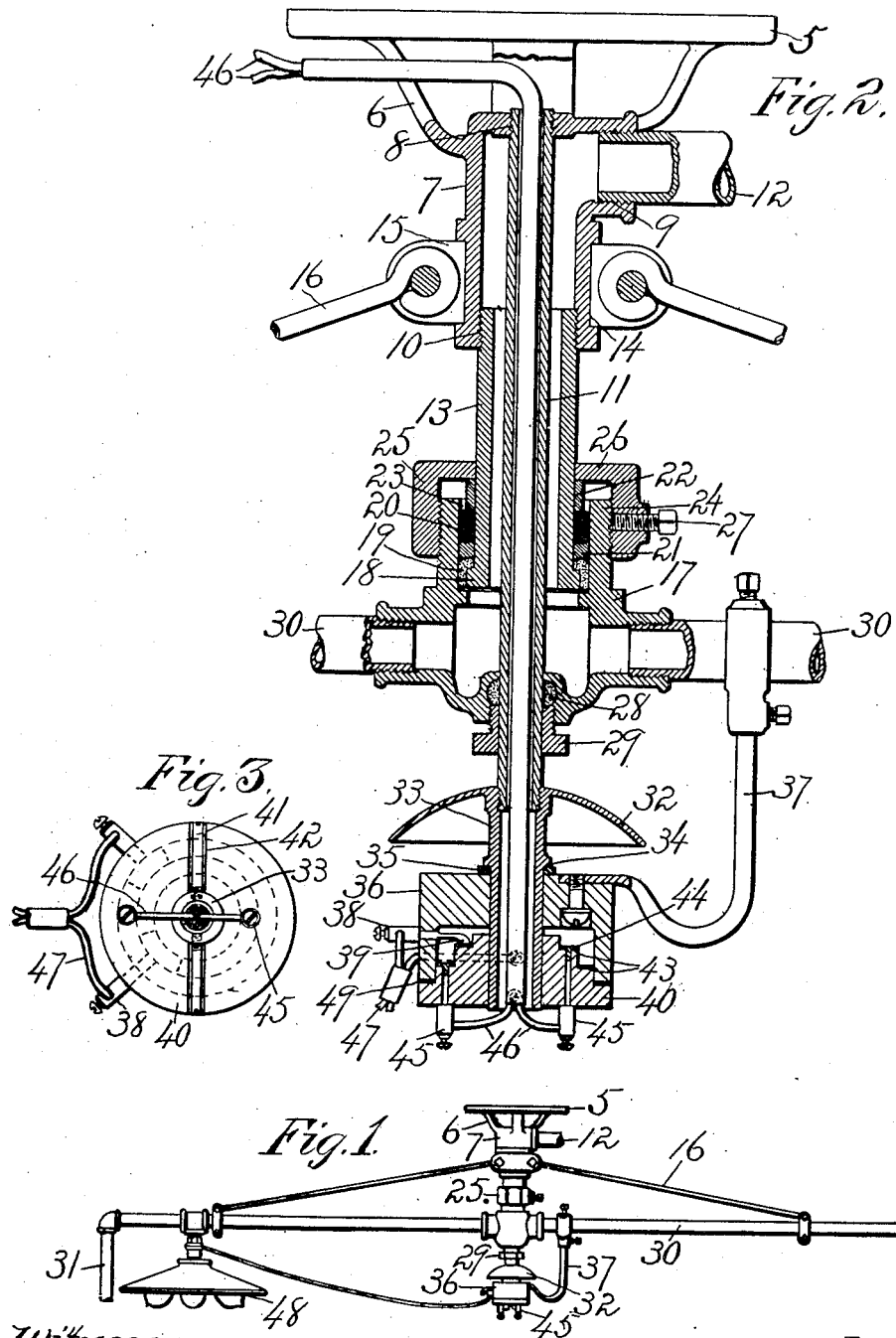

LEVERETT E. RHODES, OF HARTFORD, CONNECTICUT.

VEHICLE-WASHER.

No. 892,448.      Specification of Letters Patent.      Patented July 7, 1908.

Application filed September 11, 1907. Serial No. 392,360.

*To all whom it may concern:*

Be it known that I, LEVERETT E. RHODES, a citizen of the United States, and a resident of Hartford, in the county of Hartford and State of Connecticut, have invented a new Improvement in Vehicle-Washers, of which the following is a specification.

My invention relates to the class of devices with which a stream of water may be easily conducted to various points for the purpose of washing vehicles or like structures, and the object of my invention is to provide an effective device for this purpose having means for thoroughly protecting the lighting apparatus from the entrance of water; and a further object of the invention is to so construct a device that while providing for the free delivery of water shall at the same time possess means for freely conducting a current of electricity; and a further object of the invention is to provide a device in which the placing of the nozzle and consequently the light in any position shall be unrestricted.

A form of device in the use of which these objects may be attained is illustrated in the accompanying drawings, in which—

Figure 1 is a view illustrating the general construction of my improved device. Fig. 2 is a detail view on enlarged scale as to a greater part, in central vertical section, through the structure, the binding post secured to the shell, however, being shown out of position in order to facilitate the illustration. Fig. 3 is an end view of the insulating shell.

In the accompanying drawings a hanger consisting of a base 5, arms 6, and a hub or union 7, is constructed for attachment to a ceiling or like part. This union has several openings, preferably located as shown, an opening 8 at the top, an inlet opening 9 at one side and an outlet opening 10 at the bottom. A conduit to conduct the electric wires used in connection with the lighting apparatus extends from the hanger, in the form of apparatus herein shown this conduit consisting of a tube 11 and a stem 33 to be hereinafter described. The tube 11 is secured within the opening 8, an inlet pipe 12 within the opening 9 and a sleeve 13 within the opening 10. A groove 14 is formed in the outer surface of the union to receive a collar 15 rotatably mounted on the union and to which rod supports 16 are secured.

A head 17 is rotatably supported upon the sleeve 13 in any desired manner, as herein shown, a flange 18 on the end of the sleeve serving to hold the head in place while permitting rotation thereof.

A space 23 is formed between a neck 24 extending from the head 17 and the outer surface of the sleeve 13, and in this space is located a packing 19 about the flange 18 and a packing 20 between washers 21 and 22. The neck 24 is threaded for the reception of a nut 25 having a flange 26 with an opening for the sleeve 13. The flange abutting against the washer 22 compresses the parts, thus securely packing the joint at this point while allowing rotation of the head 17 upon the sleeve 13. A lock bolt 27 may be employed to lock the nut to the neck 24 if desired.

The tube 11 is of a length to extend through the head 17 and project therefrom, a packing 28 and gland 29 being employed to pack the joints at this point. Delivery pipes 30 are secured to the head 17, these pipes being sustained at their outer ends by the supporting rods 16. A hose 31 may be secured to either or both of the pipes 30 for the delivery of water to any desired point.

A hood 32 having a hollow stem 33, projecting centrally from its under surface, is secured to the end of the tube 11 this tube and stem forming the conduit as hereinbefore described. This hood is of proper dimensions to overlie and cover the parts immediately secured to the stem 33. This hood affords a shield for a shell located underneath and thoroughly protects the latter from the drippings of any water or moisture which might be caused by leaking at the joints, or from the conditions of the atmosphere.

The stem has a shoulder 34 to receive a washer 35 interposed between the shoulder and a shell 36. This shell is composed of porcelain or other insulating material and is mounted to rotate upon that part of the conduit included in the stem 33, it being rotatably connected to rotate with the delivery pipes 30 as by means of an arm 37 secured in any desired manner. Binding posts 38 are secured to the shell 36, projecting therethrough and having on their inner ends brushes 39, one of these brushes and posts being employed for conducting a current of electricity in one direction and the other for conveying it in the opposite direction. A cap 40 also constructed of porcelain or other insulating material, and preferably with a flange overlying the edge of the shell or cup 36, is secured to the end of the conduit, namely, to the stem 33, as by means of screws 41 projecting through grooves 42 in the cap and into the stem 33. The cap has shoulders 43 lying within the shell and upon the shoulders are contact rings 44 connected with the binding posts 45. Wires 46 leading from a suitable source of electric energy, extend downward through the tube 11 and are connected with the binding posts 45. The brushes 39 are held in yielding contact with the contact rings 44, so that as the shell 36 is rotated in the operation of the device a strong electric contact is maintained at all times. Wires 47 extend from the binding posts 38 to an electric light 48, of any usual form and construction.

It will be noted from the above description that in the washing of a vehicle the conducting pipes 30 may be easily and freely rotated to any position, bringing the delivery end of the hose to any point desired. The light 48 will thus be located at all times over the point at which operations are being conducted, and in this rotation of the arms a perfect circuit for the electric current is always maintained. A packing ring 49 is located between the edge of the shell 36 and the cap 40, thus protecting the parts located within the shell against the entrance of water or the like which may be spattered in the washing operation. The conducting wires are maintained in their normal position without twisting in the rotation of the parts in use.

I claim—

1. A tubular support having a passage for water and an inlet pipe connected therewith, a head rotatably mounted on said support, a delivery pipe connected with said head, a conduit secured to said support and extending through the water passage and through said head, a shell supported by and rotatable upon said conduit, a cap fixed to said conduit, binding posts secured to the cap, wires extending through the tube and connected with said binding posts, rings mounted on the cap and connected with said binding posts, binding posts secured to the shell and in sliding contact with said rings, wires extending from said binding posts, and a lamp supported by said head to receive said wires.

2. A tubular support having a passage for water and an inlet pipe connected therewith, a head rotatably mounted on said support, delivery pipes connected with said head, a conduit secured to the support and projecting through said water passage and head, a shell rotatably supported by said conduit, an arm secured to said shell and to one of the delivery pipes, a cap secured to said conduit, binding posts mounted on said cap, contact rings on the cap connected with said binding posts, wires extending through said conduit and connected with said binding posts, binding posts secured to the shell, contacts connected with said posts and in sliding connection with said rings, a lamp supported by said head, and wires connecting said lamp with the binding posts on the shell.

3. A tubular support having a water passage and an inlet pipe connected therewith, a head rotatably mounted on said support, delivery pipes connected with said head, a conduit secured to said support and projecting through said water passage and head, a shell supported by and rotatable upon said conduit, a cap secured against rotation and having shoulders located within said shell, contact rings located on said shoulders, binding posts on the cap connected with said rings, wires extending through the conduit and connected with said binding posts, binding posts secured to said shell, contacts connected with said posts and in sliding engagement with said rings, a lamp supported by said head, and wires connecting said lamp and the binding posts on the shell.

4. A tubular support having a water passage therethrough and an inlet pipe connected thereto, a head rotatably mounted on said support, delivery pipes extending from said head, a tube secured to said support and extending through the water passage therein, a hood secured to the end of the tube and having a stem, a shell rotatably mounted on said stem, a cap secured to said stem, binding posts secured to the cap, contact rings located within the shell and connected with said posts, wires extending through said tube and connected with said binding posts, binding posts secured to said shell, contacts connected with said posts and in sliding engagement with said rings, a lamp supported by said head, and wires connecting said lamp and binding posts on the shell.

5. A tubular support having a water passage and an inlet pipe connected thereto, a head rotatably mounted on said support, delivery pipes extending from said head, a conduit secured to said support and projecting through the water passage therein, a shell supported by and rotatable upon said conduit, a cap projecting within said shell and rigidly connected with said conduit, a packing located between said cap and shell, binding posts secured to the cap, contact rings located within the shell and connected with said posts, wires extending through said conduit and connected with said binding posts, binding posts secured to said shell, contacts connected with said posts and in sliding engagement with said rings, a lamp supported by said head, and wires connecting said lamp and binding posts on the shell.

6. A tubular support having a water passage and an inlet pipe connected therewith, a head rotatably mounted on said support, delivery pipes connected with said head, a tube secured to said support and projecting from said water passage and head, a hood secured to said tube and having a projecting stem, a shell mounted to rotate on said stem, and rigidly connected with the delivery pipe, a cap projecting within the shell and having shoulders, binding posts secured to the cap, contact rings located on said shoulders, and connected with said posts, wires projecting through said tube and connected with said binding posts, binding posts secured to said shell, contacts connected with said posts and in sliding engagement with said rings, a lamp supported by said head, and wires extending between said lamp and binding posts on the shell.

7. A tubular support having a water passage and an inlet pipe connected therewith, a head rotatably mounted on said support, delivery pipes connected with said head, a tube secured to said support and projecting through said water passage and head, a shell rotatably supported by said tube, a cap projecting within the shell, screws extending across the cap to secure it to said tube, binding posts located on the cap, contacts located within said shell and connected with said posts, wires extending from said tube to said binding posts, binding posts secured to the shell, contacts connected with said posts and in sliding engagement with the contacts of the binding posts from the cap, a lamp supported by said head, and wires extending between the binding posts on the shell and said lamp.

8. A tubular support having a passage for water and an inlet pipe connected therewith, a head rotatably mounted on said support, a delivery pipe connected with said head, a tube secured against rotation to said support and extending through the water passage and through said head, a shell rotatably supported by said tube a cap having a plural number of stepped shoulders located within the recess in the shell, binding posts secured to the cap, wires extending through the tube and connected with said binding posts, a ring supported upon each of a plural number of said steps and connected with said binding posts, binding posts secured to the shell and in sliding contact with said rings, wires extending from said binding posts, and a lamp supported by said head to receive said wires.

9. A tubular support having a passage for water and an inlet pipe connected therewith, a head rotatably mounted on said support, a delivery pipe connected with said head, a conduit secured against rotation to said support and extending through the water passage and through said head, a shell supported by and rotatable upon said conduit, a cap secured to said conduit and projecting within the shell, binding posts secured to the outer surface of the cap, wires extending through the conduit and connected to said binding posts, rings mounted on the cap within the shell and connected with said binding posts, binding posts secured to the shell and in sliding contact with said rings, wires extending from said binding posts, and a lamp supported by said head to receive said wires.

LEVERETT E. RHODES.

Witnesses:
    ARTHUR B. JENKINS,
    L. E. BERKOVITCH.